United States Patent [19]
Hickey

[11] Patent Number: 6,044,745
[45] Date of Patent: Apr. 4, 2000

[54] SEABED ENCLOSURES

[75] Inventor: Christopher D. D. Hickey, Haywards Heath, United Kingdom

[73] Assignee: Lawborough Consultants Limited, Balcombe, United Kingdom

[21] Appl. No.: 09/011,651

[22] PCT Filed: Aug. 9, 1996

[86] PCT No.: PCT/GB96/01945

§ 371 Date: Feb. 13, 1998

§ 102(e) Date: Feb. 13, 1998

[87] PCT Pub. No.: WO97/07017

PCT Pub. Date: Feb. 27, 1997

[30] Foreign Application Priority Data

Aug. 16, 1995 [GB] United Kingdom .................... 9516752

[51] Int. Cl.$^7$ ........................................................ F41F 3/07
[52] U.S. Cl. .......................................... 89/1.809; 102/399
[58] Field of Search ................................ 89/1.809, 1.811, 89/1.11; 102/406, 411, 412, 408, 390, 391, 392

[56] References Cited

U.S. PATENT DOCUMENTS

| | | | |
|---|---|---|---|
| 3,035,285 | 5/1962 | Squires, Jr. .............................. 114/295 |
| 4,395,952 | 8/1983 | Hickey ...................................... 89/1.81 |
| 4,566,367 | 1/1986 | Hickey ...................................... 89/1.81 |
| 4,586,421 | 5/1986 | Hickey et al. ............................ 89/1.81 |
| 5,837,919 | 11/1998 | Yagla et al. .............................. 89/1.816 |

*Primary Examiner*—Charles T. Jordan
*Assistant Examiner*—Denise J. Buckley
*Attorney, Agent, or Firm*—Smith, Gambrell & Russell, LLP

[57] ABSTRACT

The disclosure relates to an enclosure for weaponry, listening, identifying, recording, communications equipment or the like for use in or on the seabed. The enclosure comprises an outer cylindrical container (10) having a buoyancy chamber (34) to render one end (11) of the container more buoyant than the other (12) so that the container lies in a vertical orientation when disposed in the sea. At the other end (12) of the container there are propeller/impellors (28) for activating sand/silt/shingle on the seabed to create a cavity below the container into which the container can self bury. A container has a payload compartment (32) for holding weaponry, listening, recording and/or communications equipment. The container was has a double (13,14) wall partitioned (15) to form a plurality of separate passages (A,B,C) extending spirally from inlets (16,17,18) at the lower end of the container upwardly to outlets (25,26,27) at the top of the container through which activated sand/silt/shingle and water generated at the lower end of the container can flow upwardly and freely as the container self buries in the seabed.

11 Claims, 11 Drawing Sheets

SEABED ENCLOSURES

BACKGROUND OF THE INVENTION

This invention relates to a seabed enclosure for holding weaponry, communication and/or recording equipment.

SUMMARY OF THE INVENTION

The invention provides an enclosure for weaponry, communications, listening, identification or recording equipment or the like for use on/in the seabed comprising an outer cylindrical container having means to render one end of the container more buoyant than the other so that the container lies in a vertical orientation when disposed in the sea, means at the other end of the container for activating sand/silt/shingle on the seabed to create a cavity below the container into which the container can self bury and a payload compartment within the container for holding weaponry and/communications, listening identification or recording equipment, wherein the container wall is formed with a plurality of separate passages extending spirally from inlets at the lower end of the container upwardly to outlets at the top of the container through which activated sand/silt/shingle and water generated at the lower end of the container can flow upwardly as the container self buries in the seabed.

Preferably the container has inner and outer concentric walls partitioned to form a plurality of spirally extending passageways leading from inlets at the lower end of the container to outlets at the upper end of the container for delivery of sand/silt/shingle, and water activated at the lower end of the container to the upper end of the container.

More specifically said inlets may be formed between the concentric walls of the container at the lower end thereof.

In addition said outlets may be formed in the outer periphery of the upper end of the container.

In any of the above arrangements the upper end of the container may be a cup shaped head through which said passages extend to outlets at the outer periphery of the cup and a buoyancy chamber is formed within the cup to render the upper end of the container more buoyant than the lower end as aforesaid.

Also in any of the above arrangements a plurality of motor driven impellers/propellers are mounted within the lower end of the container to act on the seabed below adjacent the respective inlet to the passages between the container walls.

Thruster pumps may be provided at spaced locations around the upper end of the container for maintaining the container upright as it self buries into the seabed and the inner container has gyro control equipment for controlling the thruster pumps.

The inner container may also include means to detect signals, vibration or noise transmitted through the seabed to activate the weaponry, identification/ communications, listening or recording equipment enclosed in the inner container.

BRIEF DESCRIPTION OF THE DRAWINGS

The following is a specific description of some specific embodiments of the invention, reference being made to the accompanying drawings, in which.

DETAILED DESCRIPTION OF THE INVENTION

Figure 1:
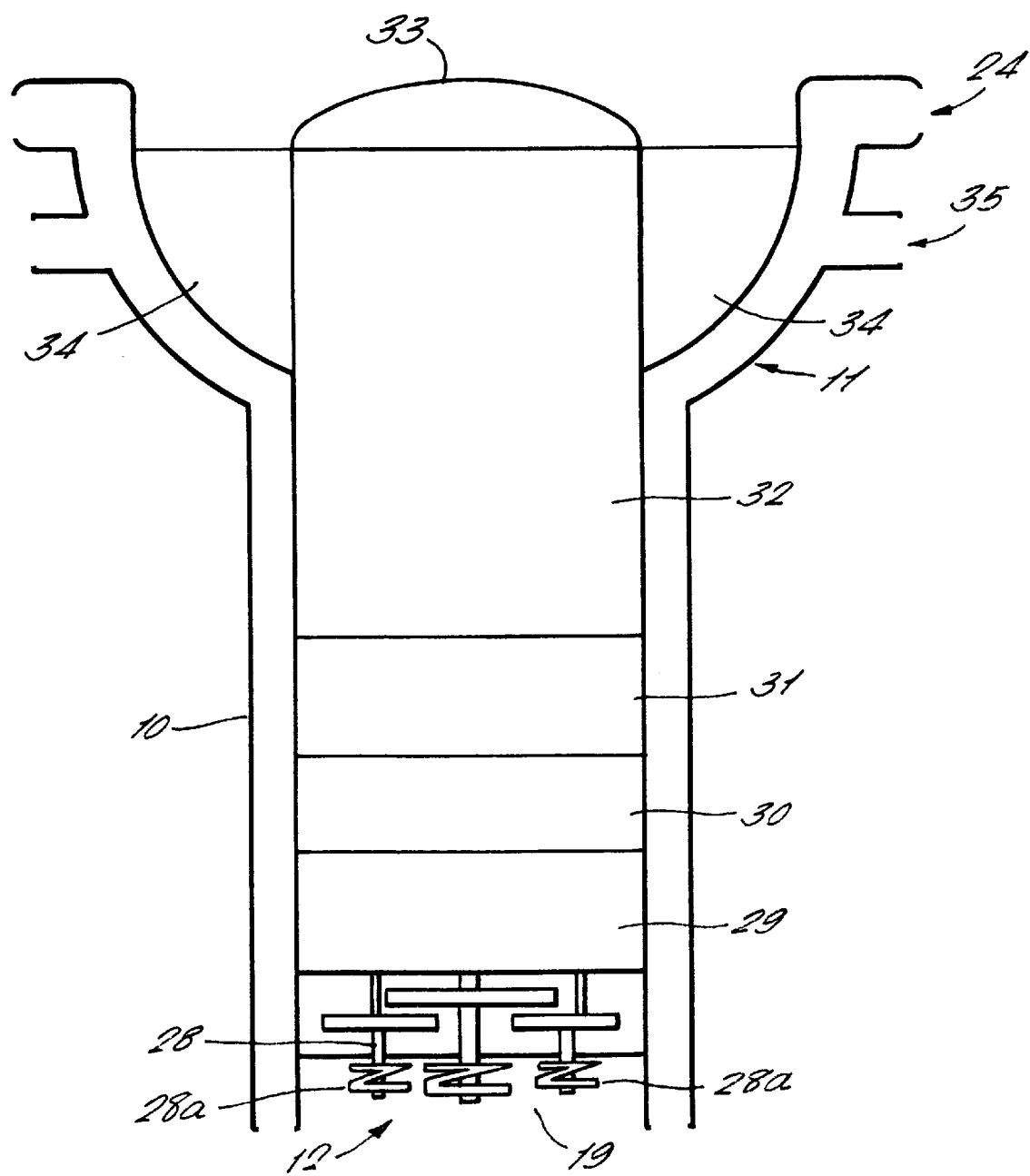
FIG. 1 is an elevation view of the seabed enclosure according to the invention.
Figure 2:
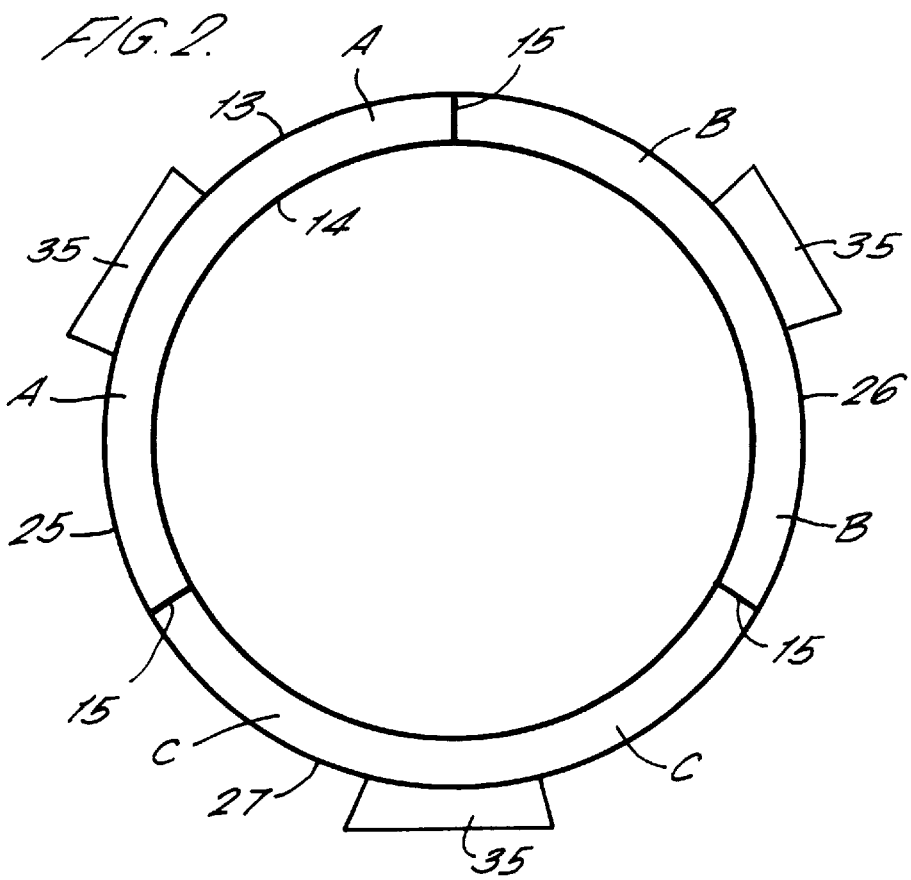
FIG. 2 is a plan view of the enclosure of FIG. 1.
Figure 3:
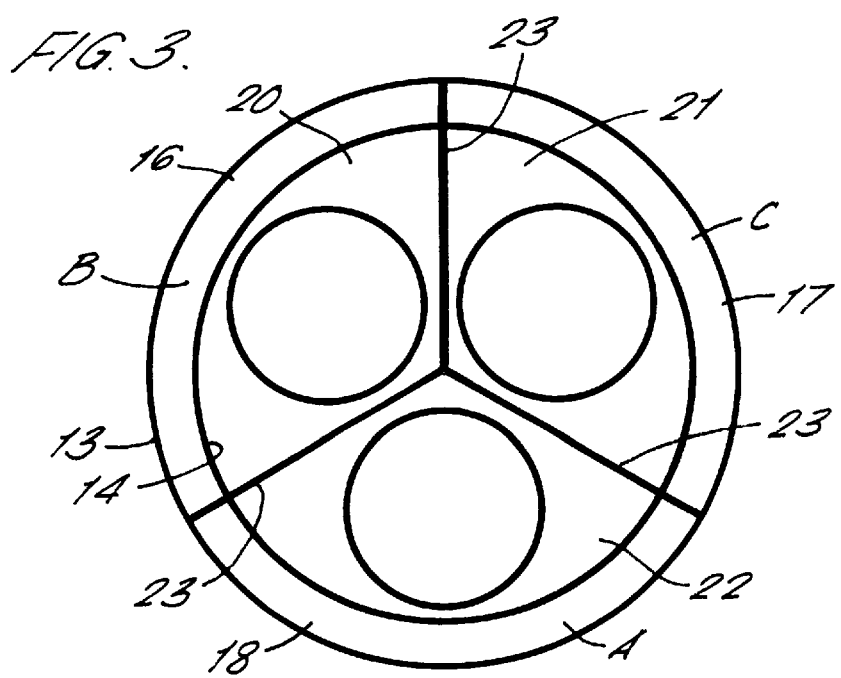
FIG. 3 is an under view of the enclosure.
Figure 3A:
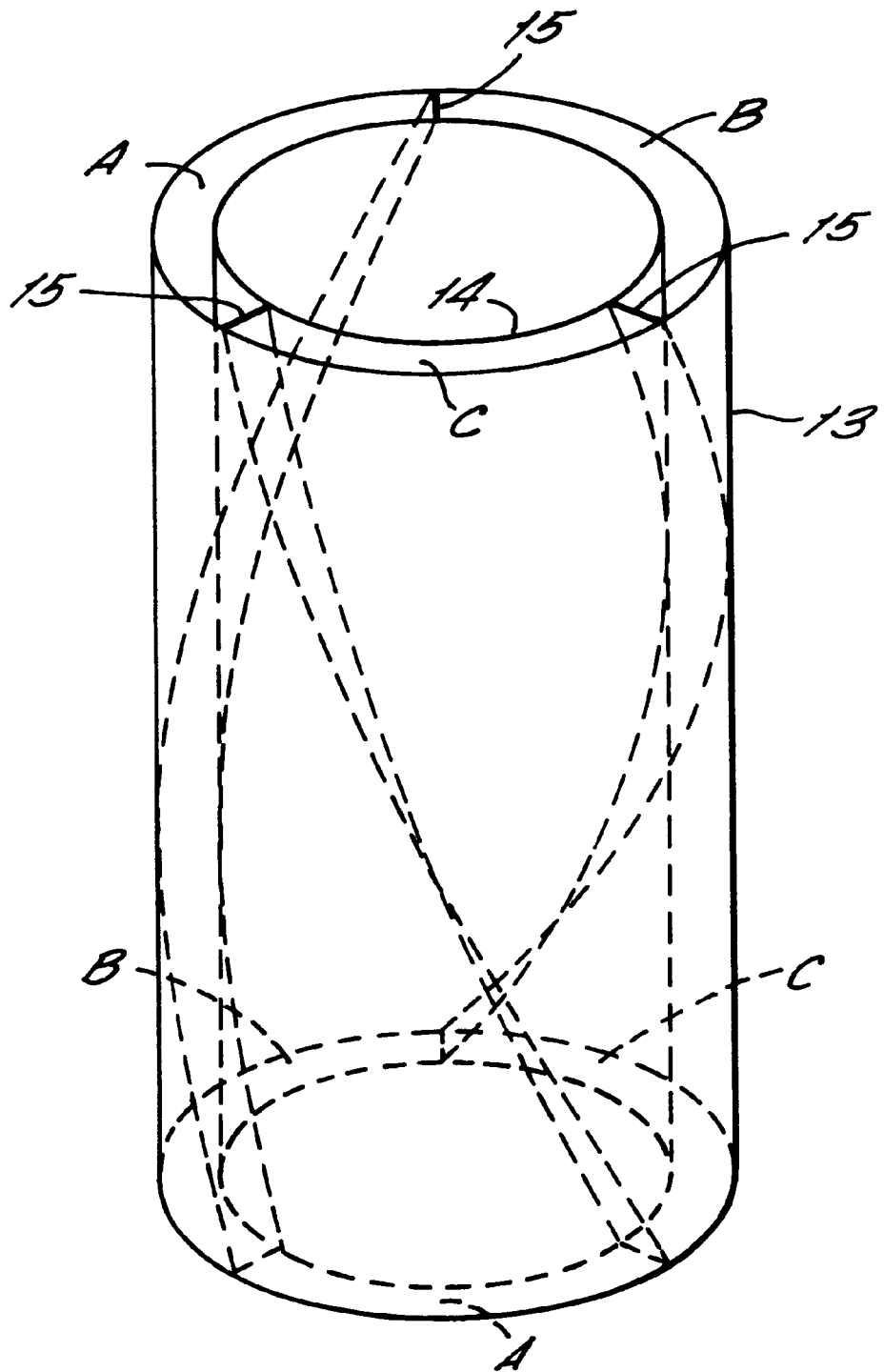
FIG. 3a is a perspective view of a portion of the enclosure.

Referring firstly to FIGS. 1 to 3 of the drawings, there is shown a seabed enclosure in the form of an upright outer cylindrical container 10 which terminates in a cup shape head 11 at its upper end and has an open lower end 12. Preferably the container is manufactured from anechoic materials. The container and cup shaped housing are both of double walled construction as best seen in FIGS. 2, 3, and 3a, the outer wall being indicated at 13 and the inner wall being indicated at 14. The space between the inner and outer wall is divided into three sectors A, B and C by three internal partitions 15. The partitions are wound spirally around the container as they extend between lower end of the container and the upper of the cup shaped housing for a purpose to be described below.

The cavities A, B and C have corresponding inlets 16, 17 and 18 at the bottom end of the outer container and the open space at the bottom end of the container indicated at 19 on FIG. 1 is similarly divided into three sectors 20, 21 and 22 by partition 23.

At the top of the cup shaped housing there is an out-turned flange formation 24 formed with three peripheral outlets 25, 26 and 27.

In a variation of the apparatus, the cup shaped housing is located at the lower end of the container and is ballasted to make that end heavier and a buoyancy chamber is provided at the upper end.

At the lower end of the container within the cavity 19 three impeller/propellers 28 are mounted in the respective sectors 20, 21 and 22. The impeller/propellers are driven by drive motors mounted in a sealed compartment indicated at 29 and powered by compressed air, gas or batteries housed in a compartment above indicated at 30. The impeller/propellers may have augers 28a which engage and stir-up sand, silt or shingle on the seabed. The resulting mixture of water and sand/silt/shingle can enter the inlets 16, 17 and 18 at the bottom of the container and flow upwardly through the spiral passages to exit from the outlets 25, 26 and 27 in the outwardly facing flange at the top of the cup shaped housing at the head of the container to deposit on the seabed around the container. Thus, over a period of time, the container can self bury into the seabed.

Above the compressed air/battery compartment 30 in the container there is a compartment containing gyro and control equipment 31 and above that there is a payload compartment 32 for weaponry and communications devices. The compartment 32 projects upwardly into the cup shaped housing and has a releasable domed shaped cap 33. The space in the cup shaped housing 11 around the upper end of the compartment 32 is occupied by a buoyancy chamber 34 which ensures that the upper end of the container is more buoyant than the lower end so that as the container sinks in the water after being released, it is vertically orientated as illustrated. When the container has settled into the seabed and has buried itself, the upper end of the container is flooded by operation of control valves not shown, thereby ensuring greater stability, and reducing resonance in the reception of seismic signals.

To assist in aligning the container as it sinks into the seabed, side thruster pumps 35 are mounted on the outside of the cup shaped housing controlled by the gyro/control equipment disposed in the compartment 31. The pumps ensure vertical alignment of the container as it lowers into the seabed.

Figure 4:
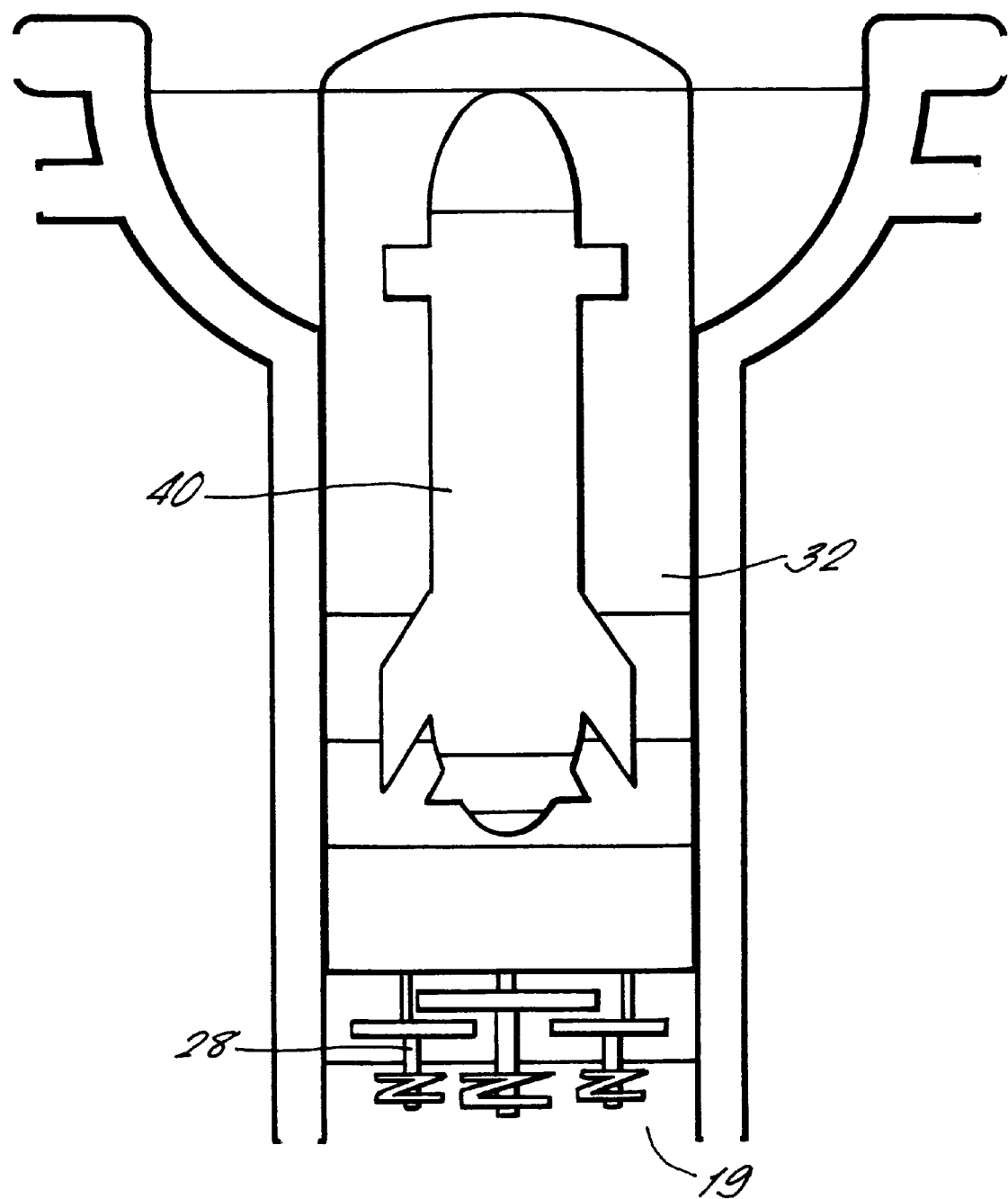
FIG. 4 illustrate an embodiment of the enclosure containing a weapon.
Figure 5:
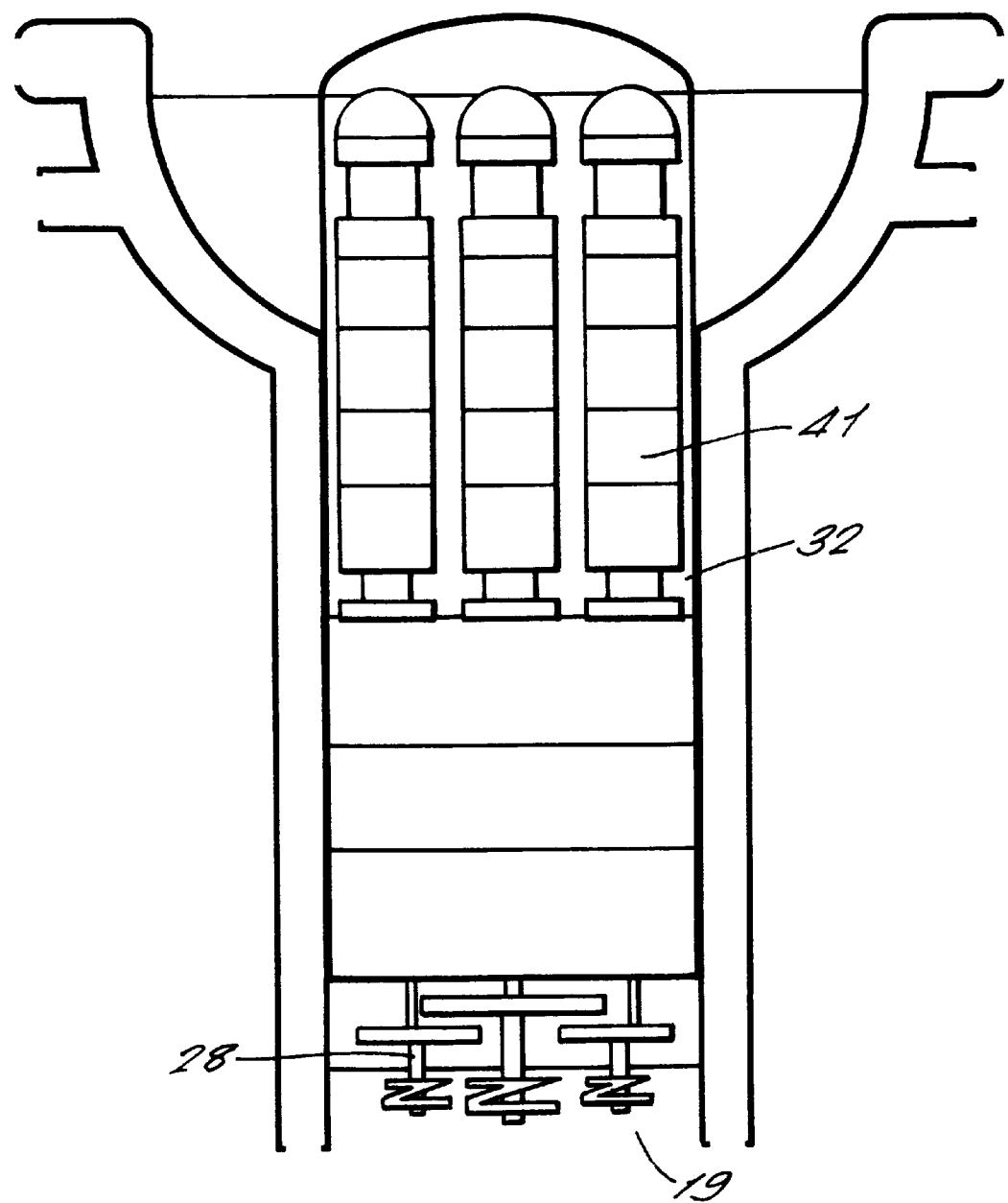
FIG. 5 illustrates an embodiment of the enclosure containing communication devices.

FIG. 4 of the drawings shows an application of the device in which the payload compartment 32 contains a weapon 40 and FIG. 5 of the drawings shows an application of the device in which the payload compartment 32 contain communication buoys 41.

Figure 6:
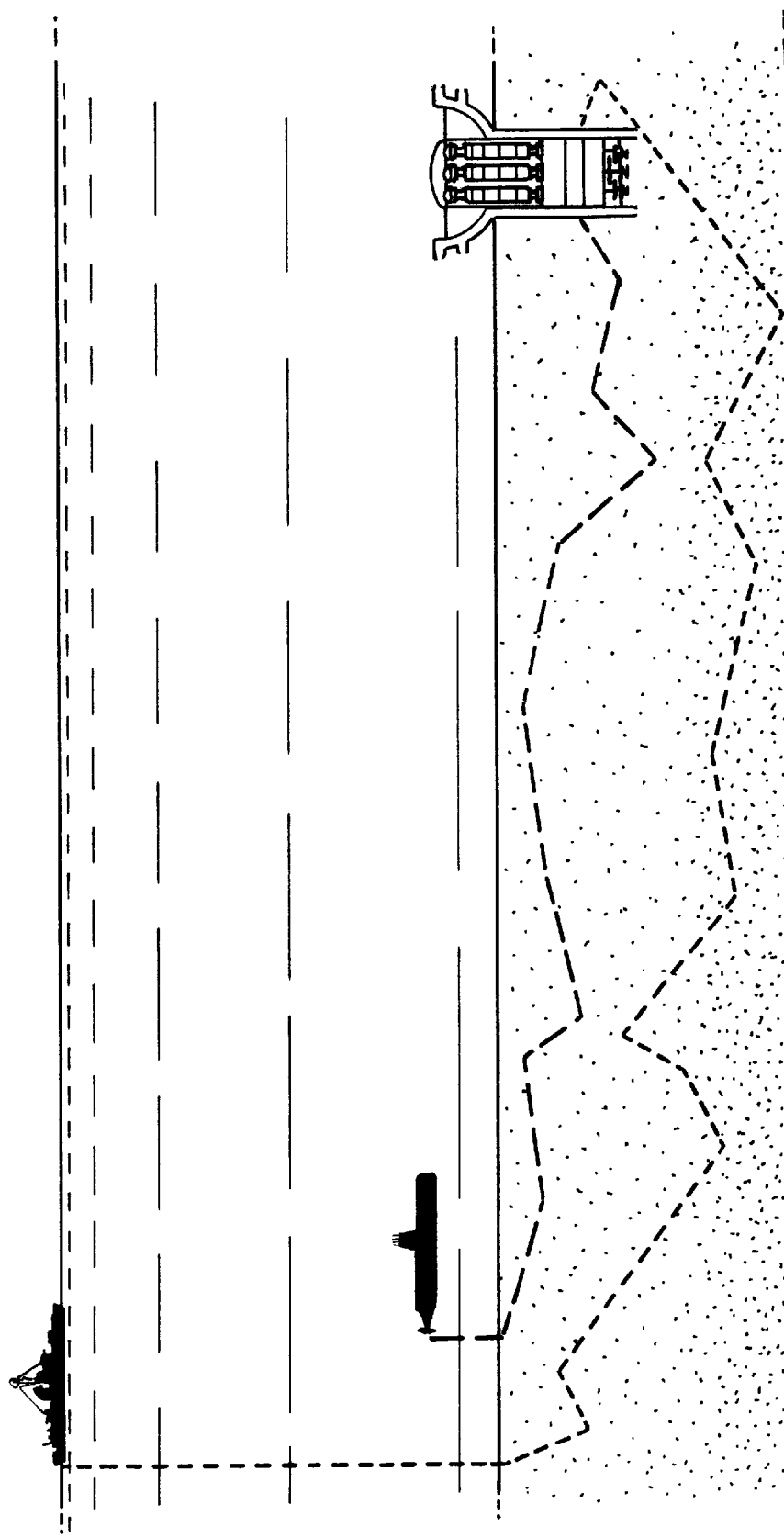
FIG. 6 illustrates the enclosure buried in the seabed and receiving signals from surface ship and submarine.
Figure 7:
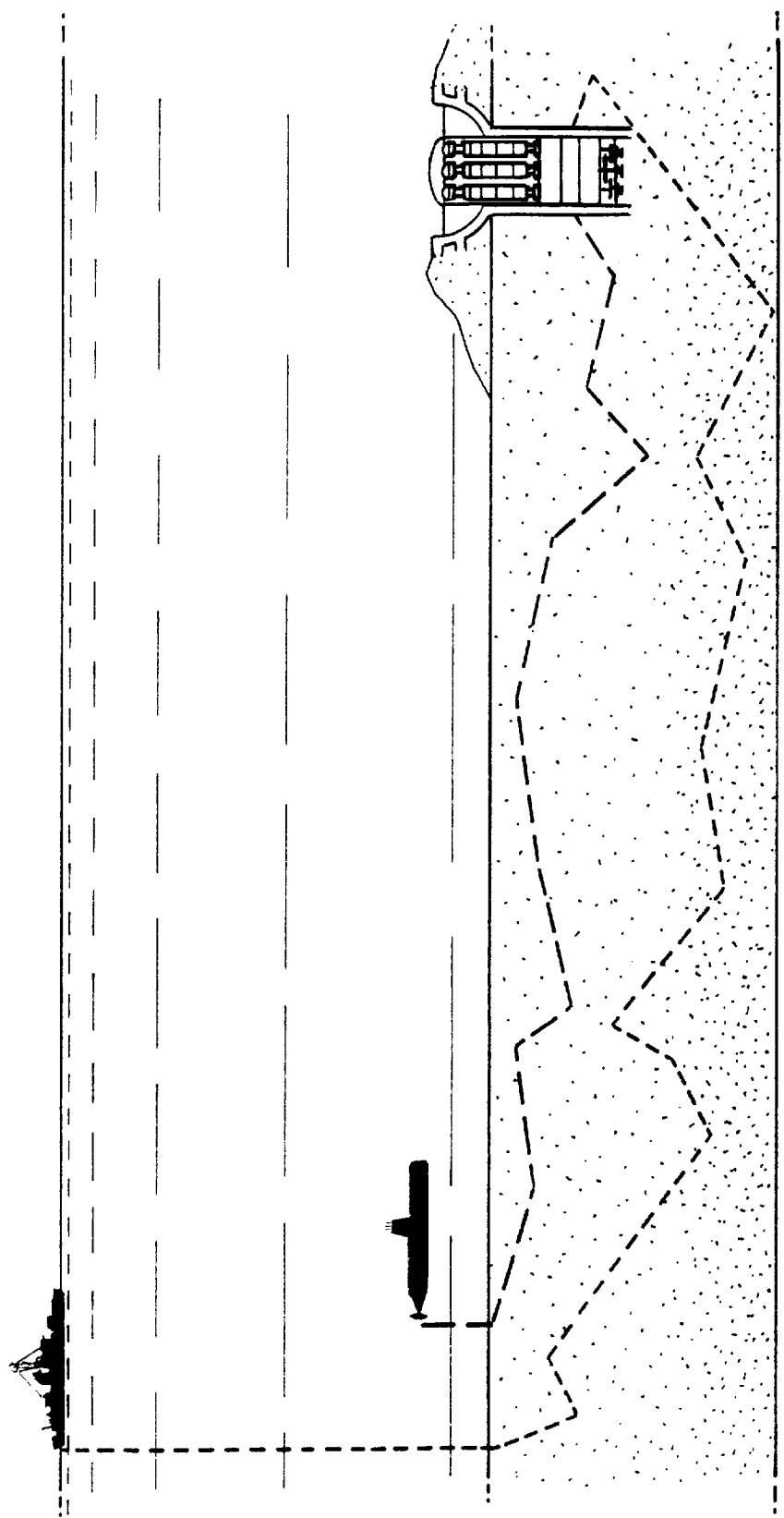
FIG. 7 is a similar view to FIG. 6.
Figure 8:
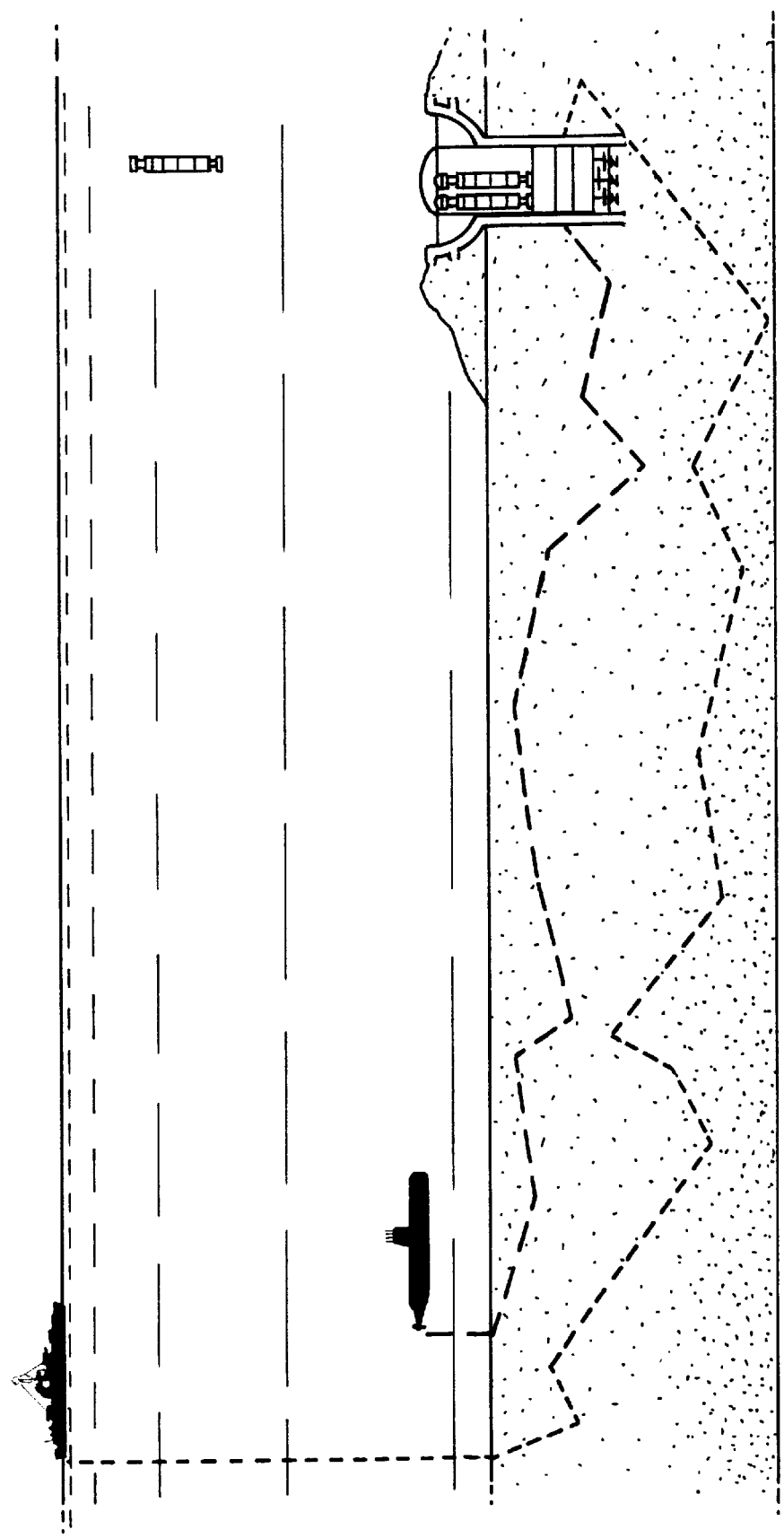
FIG. 8 is a similar view to FIG. 6 and FIG. 7 showing a communications device released from the enclosure partway to the surface.
Figure 9:
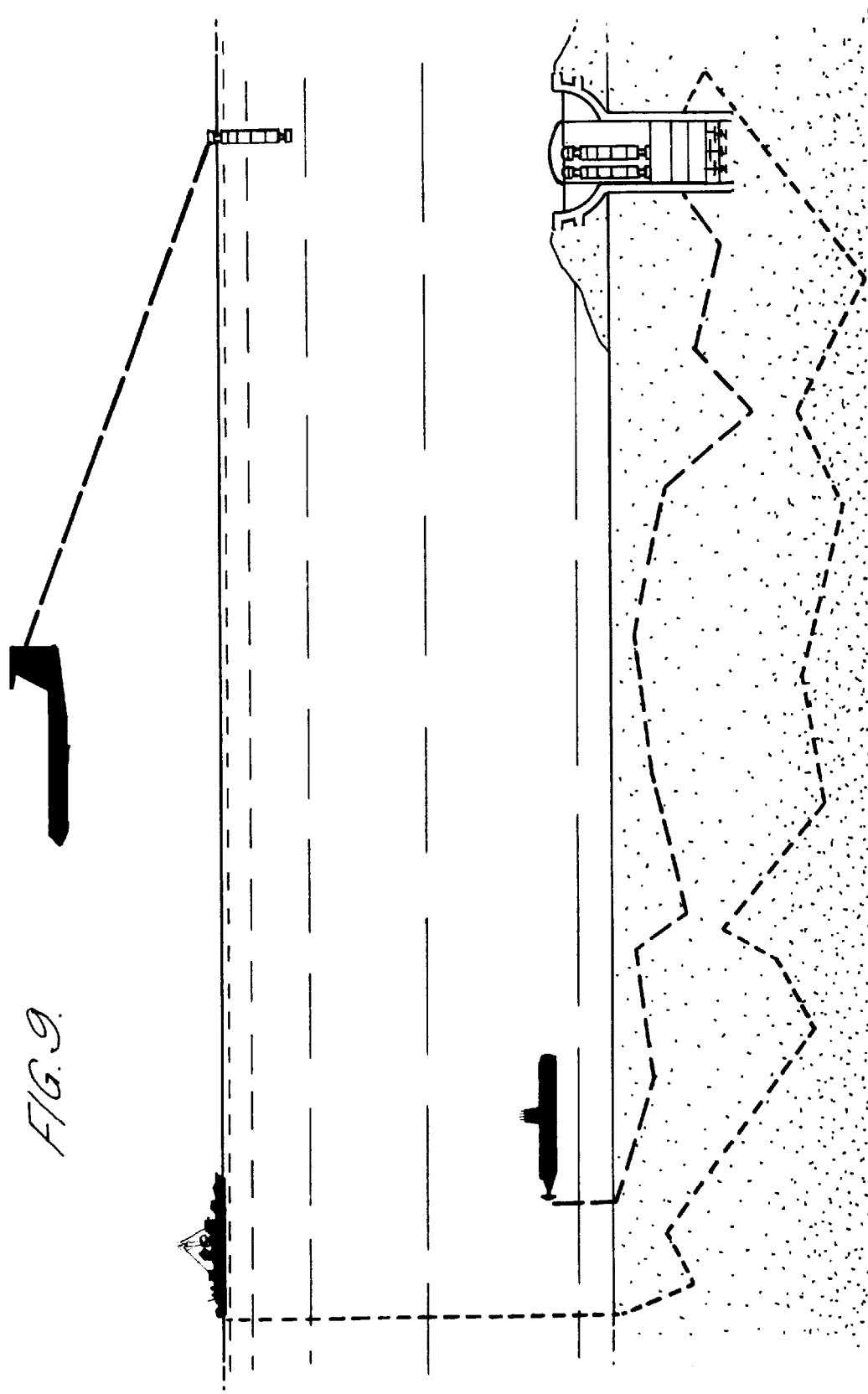
FIG. 9 is a similar view to FIG. 8 showing the communication device at the surface and transmitting a signal to a passing aircraft.

FIGS. 6 to 9 show the enclosure buried in the seabed and receiving signals from a surface ship and a submarine. In FIG. 6 the cup shaped housing of the container is clear of the seabed. In FIG. 7 the housing is shown embedded in sand/silt which would typically happen after a period of time. In FIG. 8 a communication device has been released from the payload compartment and is rising to the surface and in FIG. 9 the device has reached the surface and is transmitting a signal to an overflying aircraft. The device may include G.P.S. (global positioning system) so that a signal representing the precise position of the device may be transmitted.

FIGS. 6 to 9 illustrate communication with vessels through the seabed itself. To that end, the control department may be provided with one or more devices responsive to vibration, noise and signals transmitted through the seabed. For example the device could be a magnomometer, a seismometer, Rayleigh disc or the like. The compartment may also including recording and processing equipment which could interface with communications equipment in the payload compartment for transmitting information corresponding to signals received when the communication device is despatched to the surface.

"Sea Noise" hampers accurate recognition of acoustic signals through water. Also "Voice Prints" of different types of vessels vary significantly across the Audio Spectrum, and that the propeller noise best described as "Cavitation Beat" C.B., may be particularly distinctive, and will produce Pressure or P. Waves which can and do travel hundred of miles through the sea bed, whilst the shake or shock waves will have been damped out by passing through the water.

The P. Waves generated by C.B. of the propellers of approaching vessels, are likely to be much easier to classify—identify when transmitted through the medium of the sea bed and then stored—analysed, processed by instrumentation within a buried can.

If the containers described above are deployed in a set pattern of say four, the information gathered, e.g.—course, speed-depths and classification could then be transmitted via the radio beacons thereby alerting friendly vessels to the approach of potentially hostile forces, well in advance of their arrival.

A "Mother Can" would contain:

a) a multiplicity of sensitive, seismic, shock recording instruments e.g.:
   (i) Magnometers
   (ii) Seismometers
   (iii) Rayleigh Discs, and so on, geared into
b) recording and processing equipment which would interface with,
c) a series of releasable, buoyant, radio beacons.

The use of a "mother" can may offer the further following advantages:

a) There would be more space, thus allowing more room for shock attenuation mountings, needed to carry the sensitive—equipment, which in any event would now become minimal.

b) It should be possible to mount the recording, monitoring instruments either within, or on, a Gyroscopically stabilised container—platform, thus allowing extremely precise directional plotting of data to be achieved, particularly if the cans are deployed in a set pattern of say 4.

Equally of course the use of a multiplicity of smaller cans each with its seismic instrumentation, and radio beacon placed on the sea bed along known, suspected fault line could prove very useful in giving advance warning of ships or earthquakes e.g. Kobe and the San Andreas fault line are two prime examples.

The descent of the can through water to the seabed may be controlled either by, or in combination as follows:

a) A DROGUE, could even be the same parachute used to check the rate of descent when dropped from aircraft, b) ensuring that the majority of the weight e.g. batteries—motors and so on are at the lower end of the can, plus c) a Buoyancy Chamber—Ring at the upper end of the can, with or without the addition of a floating sinker—drogue attached by line. There will remain the need to ensure that:

a) either the can remains vertical when burying into the seabed, and/or b) the recording equipment registering the information is in a stabilised orientation, or any deviation is compensated for, (by the software perhaps), before the collected data is subsequently transmitted. With regard to (a) above, this may be accomplished either separately or in combination with:

i) the three independently actuated propellers scouring the seabed and impelling the material displaced up the three separate-matching spoil channels, ii) a multiplicity of Thruster Motors operating at right angles near the top of the can, and spaced equidistant around its circumference-periphery, and iii) directing the efflux from the spoil channels, which are so constructed as to spiral through 180° up from the bottom to the top of the can, thereby discharging directly opposite to the intake.

All motors-propellers, will be controlled from a gyroscope pre-set to maintain a desired position-attitude when uncaged and operating. In the same way, the equipment needed to interpret and analyse the signals received may also be mounted on a Gyro stabilised platform, or within similarly stabilised inner container, thus ensuring the instruments are finely tuned to a pre-determined position.

In consequence, when the can deviates from the desired angle of entry, the propellers/impellers on the lower side of the bottom of the can, will slow-stop, while that on the opposite higher side will continue to operate thereby attempting to maintain the desired angle of entry. In addition the efflux through the port of the top of the can, positioned at 180° to the inlet, will assist as will the thruster pumps, which will also be actuated to assist in maintaining the desired angle of entry.

The accompanying drawings of the can indicate the use of a) Battery Box b) Compressed Air Chamber, and/or c) Pump Compartment.

It may be possible to store sufficient energy—gas, or H.P. Air to operate a different type of mechanism or water or both.

For instance, if the air is discharged through a rotating arm, with the outer nozzles discharging at an angle to assist the flow of spoil upwards into the spoil channels, whilst at the same time downwardly facing outlets were agitating the seabed material into suspension it might prove a more economical method of burying the can, and with a spring loaded, or flexible arm help to displace large cobbles, which might tend to stop the rotation of the arm.

In the event that one or more of the flexible arms or non rigid propellers does become jammed, a reversing control may be embodied in the system allowing them to operate in the reverse direction, accompanied by pulses of air-water thereby assisting in overcoming any obstruction.

There will be a relationship between the effectiveness of displacement and the distance from the sea bed at which the propellers-agitators-impellers operate, depending on the composition of the material encountered e.g. sand, clay, shingle etc. For this reason an adjustable adaptor embodying a grill GRID convex bottom may be fitted to the bottom of the can in order to ensure maximum displacement of the spoil encountered. The GRILL will also tend to counteract any torque generated by the motor driven propellers.

The Payload chamber may be adapted to carry Varying payloads e.g.

a) Information Gathering Buoys b) Weaponry, or c) Seismic Monitoring Equipment.

Figure 10:
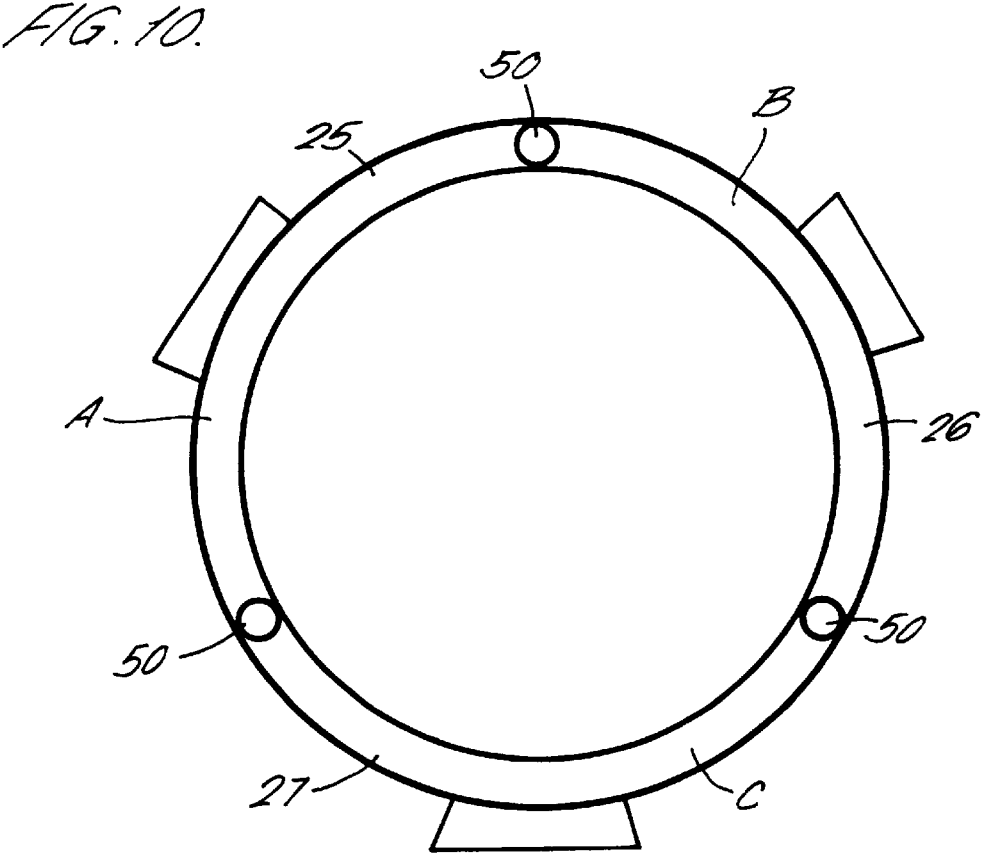
FIGS. 10 to 12 show a modified form of the enclosure.
Figure 11:
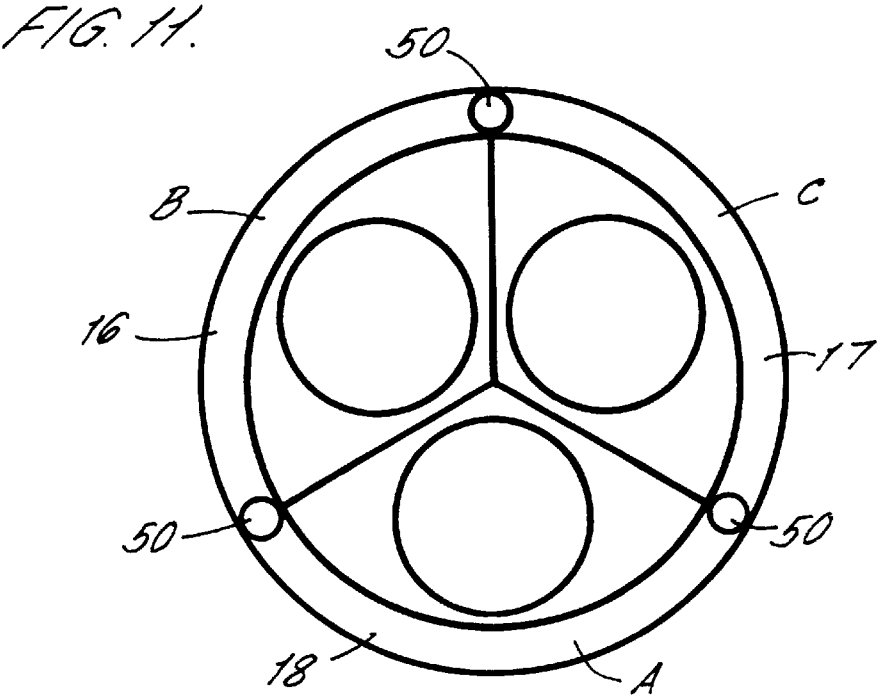
Figure 12:
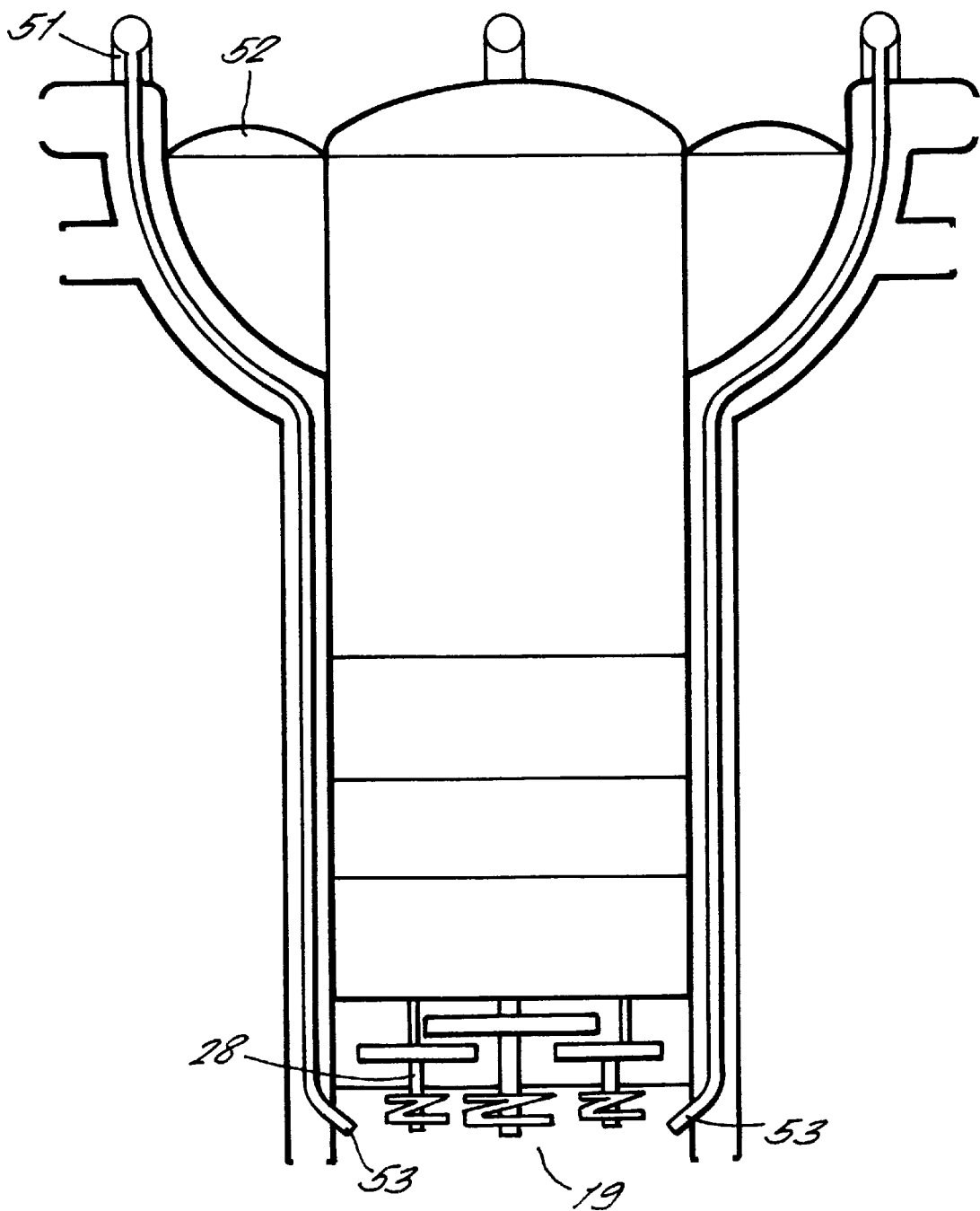

Reference is now made to FIGS. 10 to 12 of the drawings which illustrate a modified form of the container. The internal partitions between the inner and outer walls of the container are replaced by conduits 50 extending between the upper and lower ends of the container. At the upper end of the container, the conduits are connected to an annular manifold 51 encircling the head of the container and are connected to a motor driven water pump 52 mounted in the cup shaped head for delivering water into the manifold distribution to the conduits. At the lower end 12 of the container the conduits 52 have discharge nozzles 53 for directing water flow into the cavity 19 to assist in the scarring action of the impeller/propellers 28 to maintain the sand/silt/shingle released from the seabed by the impellers in a fluid state to be drawn up through the inlets 16, 17 and 18 5 to the top of the container to exit from the outlets 25, 26 and 27 as described earlier.

I claim:

1. An enclosure for use in or on a seabed, comprising:

a cylindrical container defining a compartment, means for rendering a first end of the container more buoyant than a second end of the container opposite the first end, so that the container lies in a vertical orientation when disposed in the sea, means at the second end of the container for activating sand/silt/shingle on the seabed to create a cavity below the container into which the container can self bury, and a plurality of separate passages formed on the container and extending spirally from inlets defined at the second end of the container to outlets defined at the first end of the container through which activated sand/silt/shingle and water generated at the second end of the container can flow freely to the first end of the container as the container self buries in the seabed.

2. An enclosure as claimed in claim 1, wherein the container includes inner and outer concentric walls, and the passages are formed by partitions between the inner and outer concentric walls.

3. An enclosure as claimed in claim 2, wherein said inlets are defined between the concentric walls of the container.

4. An enclosure as claimed in claim 2, wherein said outlets are defined in an outer periphery of the container at the first end thereof.

5. An enclosure as claimed in claim 1, wherein the first end of the container includes a cup shaped head through which the passages extend to the outlets, and the means for rendering the first end of the container more buoyant includes a buoyancy chamber formed within the cup shaped head.

6. An enclosure as claimed in claim 1, further including a plurality of motor driven impellers/propellers mounted within the second end of the container to act on portions of the seabed adjacent the inlets.

7. An enclosure as claimed in claim 1, further including thruster pumps provided at spaced locations around the first end of the container for maintaining the container upright as the container self buries into the seabed, and gyro control equipment for controlling the thruster pumps.

8. An enclosure as claimed in claim 1, further including weaponry or communications equipment, and means to detect signals, vibration or noise transmitted through the seabed to activate the weaponry or communications equipment.

9. An enclosure as claimed in claim 1, further including means for delivering water from the first end of the container to the second end of the container to assist in maintaining a mixture of sand/silt/shingle released from the seabed in a fluid suspension for freely flowing through the passages.

10. An enclosure as claimed in claim 9, wherein the means for delivering water to the second end of the container includes conduits extending from the first end of the container to the second end of the container between the spirally extending passages and, discharge nozzles provided at the second end of the container.

11. An enclosure as claimed in claim 10, further including a manifold encircling the first end of the container, the manifold communicating with the conduits, and a pump mounted at the first end of the container for pumping water through the manifold into the conduits.

* * * * *